US011852556B2

(12) United States Patent
Ettenauer et al.

(10) Patent No.: US 11,852,556 B2
(45) Date of Patent: Dec. 26, 2023

(54) LOAD MEASURING ARRANGEMENT FOR MAGNETOSTRICTIVE MEASUREMENT OF A LOAD ON A TEST OBJECT AS WELL AS MANUFACTURING METHOD

(71) Applicant: Trafag AG, Bubikon (CH)

(72) Inventors: Tobias Ettenauer, Stuttgart (DE); Falk von Seggern, Neckartailfingen (DE)

(73) Assignee: Trafag AG, Bubikon (CH)

( * ) Notice: Subject to any disclaimer, the term of this patent is extended or adjusted under 35 U.S.C. 154(b) by 0 days.

(21) Appl. No.: 17/941,120

(22) Filed: Sep. 9, 2022

(65) Prior Publication Data

US 2023/0073155 A1    Mar. 9, 2023

(30) Foreign Application Priority Data

Sep. 9, 2021    (DE) ...................... 10 2021 123 394.1

(51) Int. Cl.
*G01L 3/10*     (2006.01)
*G01L 25/00*    (2006.01)
*G01L 1/12*     (2006.01)

(52) U.S. Cl.
CPC .............. *G01L 3/103* (2013.01); *G01L 1/125* (2013.01); *G01L 25/003* (2013.01)

(58) Field of Classification Search
CPC ........ G01L 3/103; G01L 1/125; G01L 25/003
See application file for complete search history.

(56) References Cited

U.S. PATENT DOCUMENTS

| 11,698,312 | B2 * | 7/2023 | Fukuda | ................ H10N 35/101 |
| | | | | 73/862.333 |
| 11,732,318 | B2 * | 8/2023 | Fukuda | .................. H10N 35/01 |
| | | | | 29/90.7 |
| 2019/0187008 | A1 * | 6/2019 | Schanz | .................... G01L 3/105 |
| 2021/0270688 | A1 * | 9/2021 | Ettenauer | .............. G01L 25/003 |
| 2023/0074765 | A1 * | 3/2023 | Ettenauer | ............... G01N 3/066 |

* cited by examiner

*Primary Examiner* — Freddie Kirkland, III
(74) *Attorney, Agent, or Firm* — United One Law Group LLC; Kongsik Kim; Jhongwoo Peck (57) ABSTRACT

For more accurate load measurement, a load measuring arrangement includes a test object and a load measuring device for measuring a load on the test object. The load measuring device includes at least one magnetic field detection device for detecting a magnetic field parameter changing due to load at a measuring zone of the test object. The test object is work-hardened, at least at the measuring zone and at least in a near-surface region extending from a surface facing the magnetic field detection device to a depth of 20 μm, in such a way that it has a dislocation density of at least $5e8/cm^2$ and/or a residual stress of at least 400 MPa in amount.

14 Claims, 6 Drawing Sheets

LOAD MEASURING ARRANGEMENT FOR MAGNETOSTRICTIVE MEASUREMENT OF A LOAD ON A TEST OBJECT AS WELL AS MANUFACTURING METHOD

CROSS-REFERENCE TO RELATED APPLICATION

This application claims priority from German Application No. 10 2021 123 394.1 filed on Sep. 9, 2021, which is incorporated herein by reference in its entirety.

TECHNICAL FIELD

The invention relates to a load measuring arrangement comprising a test object and a load measuring device for magnetostrictively measuring a load applied to the test object between a first and a second region of the test object. Further, the invention relates to a use of the load measuring arrangement in a load measuring method for measuring a load applied between a first region of a test object and a second region of a test object by means of active magnetization.

RELATED ART

Load measuring arrangements and load measuring methods in which a load such as a torque, a force or even mechanical stresses in a test object are measured magnetostrictively are known. In some of these measuring methods and measuring arrangements, the measuring zone is permanently magnetized in advance; in other known measuring methods and measuring arrangements, a magnetic field is only actively applied during the measurement. In all of these methods, at least one magnetic field parameter, which changes when a load is applied to a measuring zone a of the test object, is detected to determine the load.

Load measuring arrangements and load measuring methods are known, for example, from the following literature:
[1] WO 2018/019859
[2] DE 10 2016 117 529 A1
[3] DE 10 2017 107 716 A1
[4] DE 10 2017 109 114 B4
[5] WO 2018/229016
[6] WO 2019/197500
[7] WO 2019/207166
[9] WO 2019/243448 A1
[10] DE 10 2018 120 400 A1
[11] DE 10 2018 120 401 A1
[12] DE 10 2018 124 644 B4
[13] DE 10 2018 120 794 A1
[14] WO 2020/038614 A1
[15] DE 10 2019 102 454 B3
[16] DE 10 2019 108 898 A1
[17] WO 2020/002390 A1

The invention is based on the problem of improving load measuring arrangements for magnetostrictive measurement of loads in such a way that less measurement errors occur.

SUMMARY

To solve this problem, the invention provides a load measuring arrangement and its use according to the independent claims. A manufacturing method for such a load measuring arrangement is given in the further independent claim.

Advantageous embodiments are the subject of the subclaims.

The invention provides a load measuring arrangement comprising a test object and a load measuring device for measuring a load on the test object, wherein the load measuring device comprises at least one magnetic field detection device for detecting a magnetic field parameter which changes due to a load at a measuring zone of the test object, wherein the test object is cold formed such that it has a dislocation density of at least $5e8/cm^2$ and/or a residual compressive stress of at least 400 MPa in amount at least at the measuring zone and at least in a near-surface region extending from a surface facing the magnetic field detecting device to a depth of 20 µm, It is preferred that the test object is work-hardened locally at the measuring zone.

It is preferred that the test object or a partial element thereof is made entirely of a cold-worked material.

It is preferred that the test object has a main transmission region that receives a majority of the load between a first and a second region of the test object, wherein a secondary transmission element is attached to the first and second regions of the test object so as to receive a smaller portion of the load between the first and second regions in parallel with the main transmission region, wherein the cold-worked measuring region is formed on the secondary transmission element.

It is preferred that the secondary transmission element is magnetostrictive and is attached to the test object such that deformation of the test object results in deformation of the secondary transmission element, wherein the load measuring device is adapted to detect the load on the secondary transmission element.

It is preferred that the secondary transmission element is formed from the same material as the transmission region, but material properties differ due to cold working.

It is preferred that the secondary transmission element is fixedly attached to the first region of the test object by a first connecting region and is fixedly attached to the second region of the test object by a second connecting region, wherein a measuring zone of the secondary transmission element disposed between the first and second connecting regions is not connected to the transmission region and is loaded in parallel when the transmission region is loaded, wherein the load measuring device is adapted to measure the load on the measuring zone by active magnetization and determine a magnetic parameter that changes due to the load.

It is preferred that the secondary transmission element is connected to the first and second regions of the test object by means of a connection technique selected from the group consisting of riveting, screwing, material connection, welding, soldering, bonding, shrinking-on, crimping.

It is preferred that the measuring zone of the secondary transmission element connects the first and second connecting regions in a bridge-like manner.

It is preferred that the measuring zone of the secondary transmission element has a smaller thickness and/or width than the connecting regions.

It is preferred that the secondary transmission element is configured with respect to the construction and relative geometry of the connecting regions and the measuring zone such that a strain between the first region and the second region of the test object results in greater strain at the measuring zone.

It is preferred that the secondary transmission element is designed with respect to the construction and relative geometry of the connecting regions and the measuring zone such that a strain between the first region and the second region of the test object leads to strain at the measuring zone changed in such a way that an average strain or average stress at a measuring position of the measuring zone, which measuring position extends from a surface facing a measuring sensor of the load measuring device to a depth corresponding to the penetration depth of the magnetic field, deviates by at least 20% from the average strain or average stress of the secondary transmission element.

It is preferred that the connecting regions are formed to be substantially more rigid than the measuring zone.

It is preferred that the first connecting region, the measuring zone and the second connecting region are formed as sleeves which are fastened axially successively to one another and in which the transmission region is accommodated, the connecting regions having a greater wall thickness than the measuring zone, the ends of the connecting regions which are arranged away from one another being fixedly connected to the first and second regions, respectively, of the test object, but relative movements between the sleeves and the transmission region being possible between the first and second regions.

Preferably, the measuring zone is more elastic than the transmission region.

In some embodiments, where the measuring zone has been magnetized prior to measurement so that it is magnetic itself, the load measuring device comprises only one or also more than one magnetic field parameter detection devices, for example, measuring coils.

According to particularly preferred embodiments, the load measuring device is designed as described in the aforementioned documents [1] to [16]. It thus preferably has, for example, a measuring sensor, such as sensor head with coils, in particular planar coils, more particularly in V or X arrangement, in order to generate a magnetic field by means of a generator coil and to detect magnetic field parameter changes dependent on loads by means of measuring coils.

It is preferred that the load measuring device comprises a first and a second magnetic field detection device for detecting the magnetic field parameter changing due to the load on the secondary transmission element.

It is preferred that the load measuring device comprises a magnetic field generating device for actively generating a magnetic field at the measuring zone.

It is preferred that the load measuring device comprises a generator coil and at least two measuring coils.

It is preferred that the load measuring device comprises planar coils.

It is preferred that the load measuring device comprises at least three coils arranged in a V-shape or five coils arranged in an X-shape.

It is preferred that the load measuring device includes a measuring sensor having the magnetic field generating device and the at least one magnetic field detecting device, and a supply and evaluation unit connected to the measuring sensor.

It is preferred that the test object is formed at least at the measuring zone from a material of the group comprising
  a work-hardened metallic material with a residual stress which is >400 MPa in amount and with a permeability >2,
  work-hardened steel with a residual stress which is >400 MPa in amount,
  work-hardened iron with a residual stress which is >400 MPa in amount, with <30% alloying elements,
  work-hardened nickel with a residual stress which is >400 MPa in amount, with <30% alloying elements,
  work-hardened cobalt with a residual stress which is >400 MPa in amount, with <30% alloying elements,
  work-hardened iron-nickel alloy with a residual stress which is >400 MPa in amount, with <30% other alloying elements,
  work-hardened iron-cobalt alloy with a residual stress which is >400 MPa in amount, with <30% other alloying elements,
  work-hardened cobalt-nickel alloy with a residual stress which is >400 MPa in amount, with <30% other alloying elements,
  work-hardened iron-cobalt-nickel alloy with <30% other alloying elements.

It is preferred that the load measuring device is configured to measure a force, a strain, a torque, or axial stress using an active magnetic sensor system.

It is preferred that the load measuring device comprises a measuring sensor fixedly connected to the test object and comprising the magnetic field generating device and the at least one magnetic field detection device.

It is preferred that the load measuring device comprises a measuring sensor fixedly connected to the secondary transmission element having the magnetic field generating device and the at least one magnetic field detection device.

It is preferred that the load measuring device has a stationarily mounted measuring sensor for contactless load measurement on the test object that can be rotated about an axis of rotation.

It is preferred that the test object is a shaft for transmitting a torque.

It is preferred that the test object is a gear element for transmitting a force or torque.

It is preferred that the test object is a part of a vehicle or lifting tool subjected to load operation. For example, the test object is a chassis component.

According to a further aspect, the invention provides a use of a load measuring arrangement according to any one of the preceding claims in a load measuring method for measuring a load applied to a test object, between a first region and a second region.

According to a further aspect, the invention provides a manufacturing method for manufacturing a load measuring arrangement according to any one of the preceding embodiments, comprising
  a1) providing a test object in which at least one measuring zone is formed from a metallic material having magnetostrictive properties, and plastically deforming at least the measuring zone at a temperature below the recrystallization temperature, in order to obtain a dislocation density of at least $5e8/cm^2$ and/or a residual compressive stress of at least 400 MPa in amount at least in a near-surface region extending from a surface facing the magnetic field detection device to a depth of 20 μm, or
  a2) providing a metallic material, plastically deforming at least a portion of the metallic material at a temperature below the recrystallization temperature to obtain a dislocation density of at least $5e8/cm^2$ and/or a residual compressive stress of at least 400 MPa in amount at least in a near-surface region extending from a surface facing the magnetic field detection device to a depth of 20 μm, and producing a test object from the material thus processed so that the plastically deformed region forms a measuring zone, and b) arranging a load measuring device at the measuring zone of the test object, wherein the load measuring device comprises at least one magnetic field detecting device for detecting a magnetic field parameter changing due to load at the measuring zone of the test object.

Preferably, for performing the plastic deformation in the alternative steps a1) or a2), the near-surface region is plastically deformed by using at least one of the methods selected from the group consisting of rolling, ball rolling, smooth rolling, deep rolling, blasting, ball blasting, glass bead blasting, ultrasonic blasting, stainless steel blasting, wire blasting, sand blasting, ice blasting, high-pressure water blasting, wet blasting, laser shock blasting, deep drawing, and denning.

Preferably, the manufacturing process further comprises: providing a base body of the test object, providing a secondary transmission element, wherein the secondary transmission element is manufactured separately from the base body under plastic deformation according to steps a1) or a2), fixing a first connecting region of the secondary transmission element to a first region of the test body and a second connecting region to a second region of the test body, so that the measuring zone of the secondary transmission element located between the first and second connecting regions and a transmission region of the test body located between the first and second regions can move relative to each other for performing different deformations, and arranging the load measuring device for measuring the load at the measuring zone of the secondary transmission element.

It is preferred that the load measuring device comprises a measuring sensor having the magnetic field generating device and the at least one magnetic field detection device, and a supply and evaluation unit connected to the measuring sensor. Preferred further details of the supply and evaluation unit are described in particular in [5], [7] and [17].

The secondary transmission element can be designed optimally for load measurement by active magnetization, in particular with regard to material selection.

Preferably, the secondary transmission element can be manufactured more easily separately from another base body of the test object. For example, a smaller secondary transmission element is easier to handle for material processing than, for example, larger shafts or chassis parts or the like. The secondary transmission element can then be attached to the base body of the test object so that part of the load is received via the secondary transmission element and can be measured there. From this, it is then possible to determine the load on the test object, for example after calibration.

It is preferred that the load measuring device is designed to measure a force, strain, torque or axial stress with the aid of an active magnetic sensor system.

It is preferred that the load measuring device comprises a measuring sensor fixedly connected to the test object and having the magnetic field generating device and the at least one magnetic field detection device.

It is preferred that the load measuring device comprises a measuring sensor fixedly connected to the secondary transmission element and having the magnetic field generating device and the at least one magnetic field detection device.

It is preferred that the secondary transmission element is magnetostrictive and is attached to the test object such that deformation of the test object results in deformation of the secondary transmission element, wherein the load measuring device is arranged to determine the load on the secondary transmission element.

In one embodiment, it is preferred that the secondary transmission element is formed from the same material as the transmission region. This allows measurement errors, for example due to different temperature expansions, to be reduced. By using the secondary transmission element, the geometry of the secondary transmission element can be optimized for load measurement independently of the geometry of the transmission region.

The secondary transmission element can be subjected to work hardening separately from the base body of the test object.

Experiments have shown that work hardening can improve magnetostrictive load measurements.

Some features and advantages of preferred embodiments of the invention will be explained in more detail below.

Preferred embodiments relate to magnetostrictive load measurement on a cold-formed measuring region of a test object.

Embodiments of the invention relate to such a load measurement using a secondary transmission element inserted in a secondary force or torque or load flow at which the measuring region is formed.

Embodiments of the invention relate to force/strain/axial load measurement using an active magnetic field sensor system.

In some embodiments, a base body of a test object is subjected to plastic cold forming, at least in some regions.

In some embodiments, a magnetostrictive secondary transmission element (sometimes also called a shunt) is attached to the test object such that a deformation of the test object results in a deformation of the secondary transmission element, wherein the determination of the force/strain/load is performed via the secondary transmission element, wherein the secondary transmission element is at least partially plastically cold-formed.

Embodiments of the invention relate to a load measuring arrangement on objects having an at least piecewise cylindrical surface, which can rotate by at least 5° about the cylinder axis, wherein a likewise at least piecewise cylindrical secondary transmission element is attached to the surface, which transmission element is also deformed by loads on the base body, and wherein the measuring sensor does not follow rotations of the base body.

It is preferred that the secondary transmission element is designed to serve as a signal amplifier, which is preferably achieved by structurally designing it such that strain of the base body results in non-uniform strain in the secondary transmission element, wherein the strain or average stress at the measurement position deviates by at least 20% from the average strain or average stress of the secondary transmission element, wherein the measurement position corresponds to the surface facing the measuring sensor to a depth corresponding to the penetration depth of the magnetic field.

It is preferred in some embodiments that a secondary transmission element is made of the same alloy/steel grade, although the mechanical and heat treatment may differ.

Preferably, the secondary transmission element is formed at least in some regions, in particular in a measuring zone, from work-hardened metal (e.g. cold-rolled sheet, deep-drawn cylinder) with a dislocation density $>5e8/cm^2$ or a residual compressive stress of greater than 400 MPa in amount.

Preferably, the secondary transmission element is connected to the main body by one of the following attachment methods:
1. rivets
2. screws
3. materially bonded
   a. welding
   b. soldering
   c. gluing
   d. bonding
4. shrinking
5. crimping In some embodiments, it is provided that the measuring sensor is fixedly connected to the base body. In some embodiments, it is provided that the measuring sensor is fixedly connected to the secondary transmission element.

Some embodiments of the invention relate to a load measuring arrangement comprising a test object and a load measuring device for measuring a load on the test object, wherein the load measuring device comprises a magnetic field detection device for detecting a magnetic field parameter which changes due to load, wherein at least one measuring zone (directly on the base body or on a secondary transmission element of the test object) has been plastically deformed at least in a region from the surface to a depth of 20 µm, at a temperature below the recrystallization temperature, to obtain a dislocation density of at least $5e8/cm^2$.

Accordingly, a preferred embodiment of the manufacturing process comprises plastically deforming at least a measuring zone of the secondary transmission element at least in a region from the surface to a depth of 20 µm, at a temperature below the recrystallization temperature, to obtain a dislocation density of at least $5e8/cm^2$.

Preferably, a near-surface region is or will be plastically deformed using one of the following methods:
1. rolling, e.g.:
   a. ball rolling
   b. smooth rolling
   c. deep rolling
2. blasting, e.g.:
   a. ball blasting
   b. glass bead blasting
   c. ultrasonic blasting
   d. stainless steel blasting
   e. wire shot blasting
   f. sand blasting
   g. ice blasting
   h. high-pressure water blasting
   i. wet blasting
3. laser shock peening
4. denning In one embodiment, the test object or the secondary transmission element is/are made of a previously work-hardened material.

BRIEF DESCRIPTION OF THE DRAWINGS

Embodiments of the invention will be explained in more detail below with reference to the accompanying drawings wherein it is shown by FIG. 1 a schematic block diagram of a first embodiment of a load measuring arrangement.

DETAILED DESCRIPTION

FIGS. 1 to 5 show different embodiments of a load measuring arrangement 10, which comprises a test object 12 and a load measuring device 14 for measuring a load on the test object 12.

The load measuring device 14 has at least one magnetic field detection device 16, 16a, 16b, with which a magnetic field parameter which changes due to stresses in a measuring zone 18 of the test object 12 is measured.

The test object 12 is work-hardened at least at the measuring zone 18 and at least in a near-surface region 52 extending from a surface facing the magnetic field detection device 16, 16a, 16b to a depth of 20 µm such that it has a dislocation density of at least $5e8/cm^2$ and/or a residual compressive stress of at least 400 MPa in amount.

Figure 1:
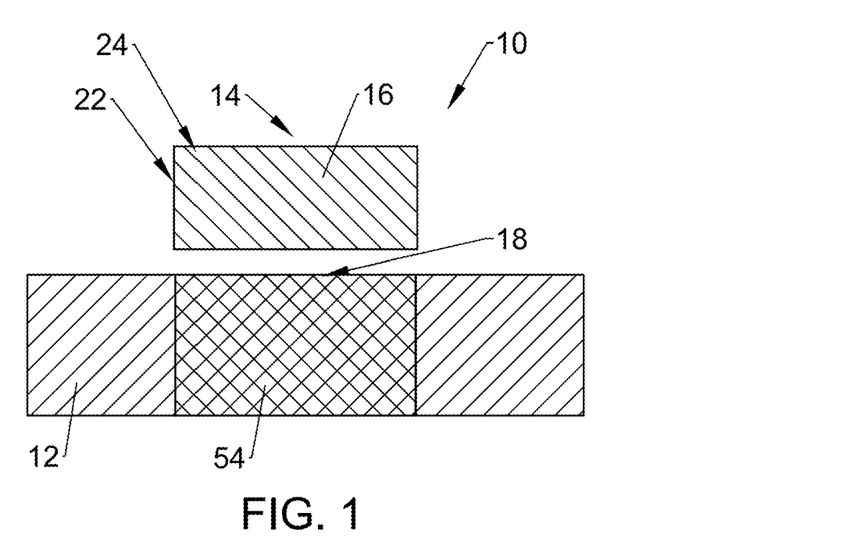
Figure 2:
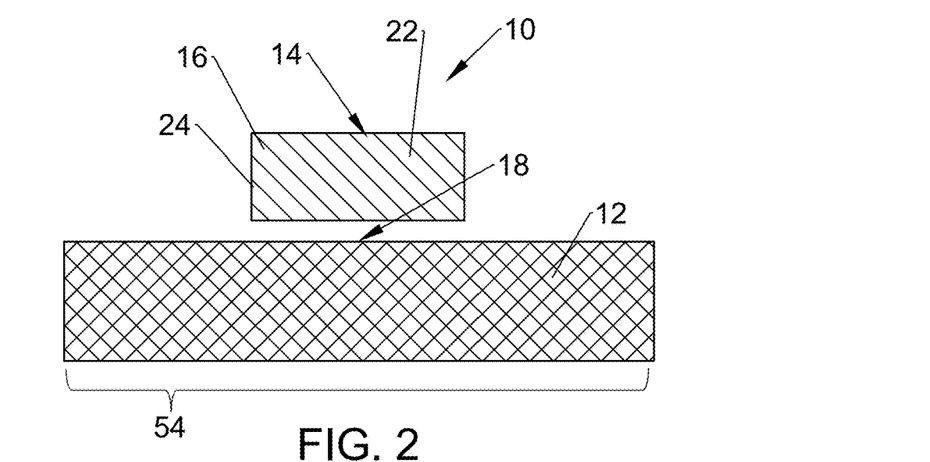
FIG. 2 a schematic block diagram of a second embodiment of the load measuring arrangement.

In the embodiments of FIGS. 1 and 2, the load measuring device 14 is merely indicated by a magnetic field detection device 16, which may be formed, for example, by a measuring coil 30. In some embodiments, the load measuring device 14 operates such that the measuring zone 18 has been permanently magnetized.

Further, the load measuring device 14 has a magnetic field generating device 20 with which a magnetic field is actively generated in the measuring zone 18. Thus the measuring zone 18 does not itself have to be permanently magnetized.

Figure 4:
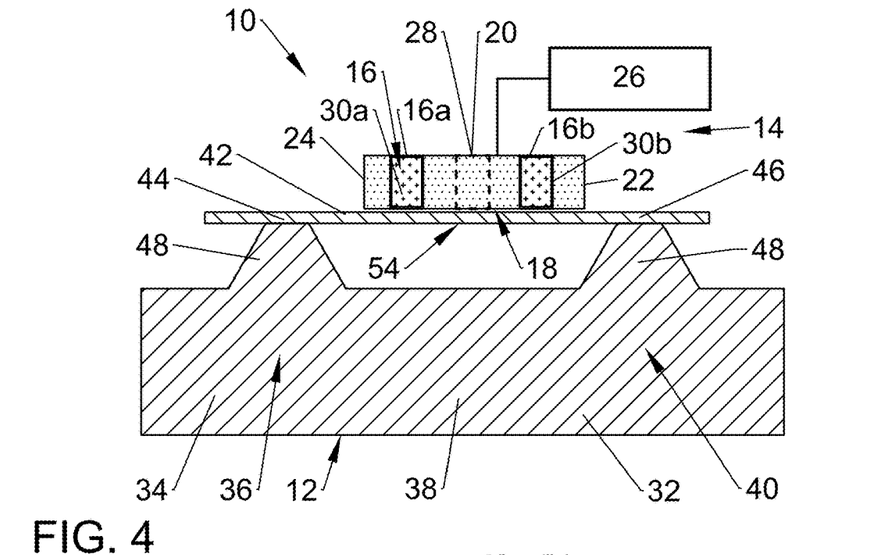
FIG. 4 a schematic block diagram of a fourth embodiment of the load measuring arrangement.

As is indicated in FIG. 4 by way of example for various possible embodiments of the load measuring arrangement 10, preferred embodiments of the load measuring device 14 have a measuring sensor 24 designed, for example, as a sensor head 22, and a supply and evaluation unit 26. The measuring sensor 24 has coils designed as planar coils in the form of a generator coil 28 for forming the magnetic field generating device 20 and in the form of a first measuring coil 30a for forming a first magnetic field detection device 16a and a second measuring coil 30b for forming a second magnetic field detection device 16*b*. Concrete possible embodiments of the load measuring device 14 including the sensor head 22 and the supply and evaluation unit 26 can be taken from literature [1] to [17] mentioned at the beginning.

Figure 3:
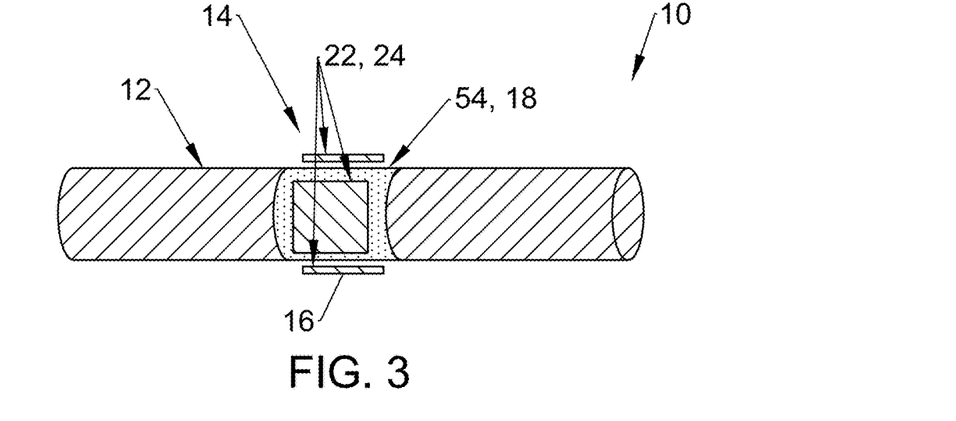
FIG. 3 a schematic block diagram of a third embodiment of the load measuring arrangement.

In some embodiments of the load measuring arrangement 10, the measuring zone 18 is formed directly on a base body 34 of the test object 12, as shown in the embodiments of FIGS. 1 to 3. In other embodiments, exemplarily shown in FIGS. 4 to 6, the test object 12 comprises a measurement object 32 and a secondary transmission element 42, wherein the measuring zone 18 is formed on the secondary transmission element 42.

The test object 12 or the measurement object 32 is, for example, a shaft, a chassis component, a power transmission element, a transmission element, a bicycle crank or any other element on which a load, such as a force, mechanical stress, torque is to be measured.

In all embodiments shown, at least the measuring zone 18, in this case in particular the near-surface region 52 from the surface facing the measuring sensor 24 to a depth of about 20 μm, is work-hardened.

This can be done, for example, by local mechanical work hardening. According to embodiments, the near-surface region 52 of at least the measuring zone 18 of the test object 12 or the secondary transmission element 42 is plastically work-hardened using one of the following methods:
1. rolling, e.g.:
    a. ball rolling
    b. smooth rolling
    c. deep rolling
2. blasting, e.g.:
    a. ball blasting
    b. glass bead blasting
    c. ultrasonic blasting
    d. stainless steel blasting
    e. wire shot blasting
    f. sand blasting
    g. ice blasting
    h. high-pressure water blasting
    i. wet blasting
3. laser shock peening
4. denning In another possible embodiment, a material such as a metal sheet is first provided from one of the above possible materials and is correspondingly plastically cold-formed, and the test object 12 or the secondary transmission element 42 is then produced from this material, for example by punching.

Figure 7:
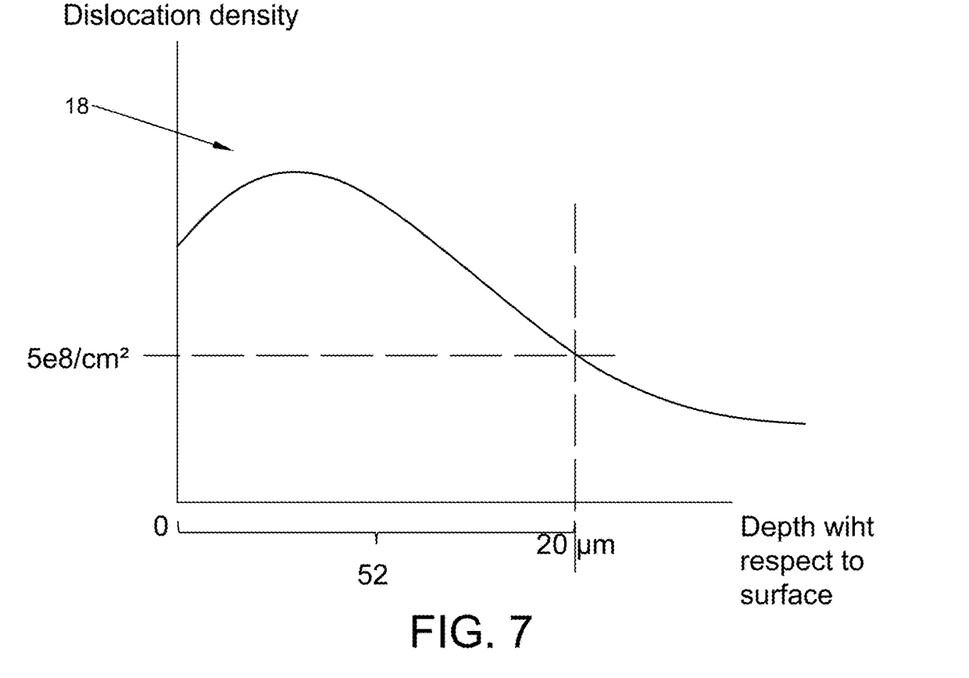
FIG. 7 a graph showing the dislocation density versus depth with respect to the surface for a measuring zone of the test object made from a work-hardened material.
Figure 8:
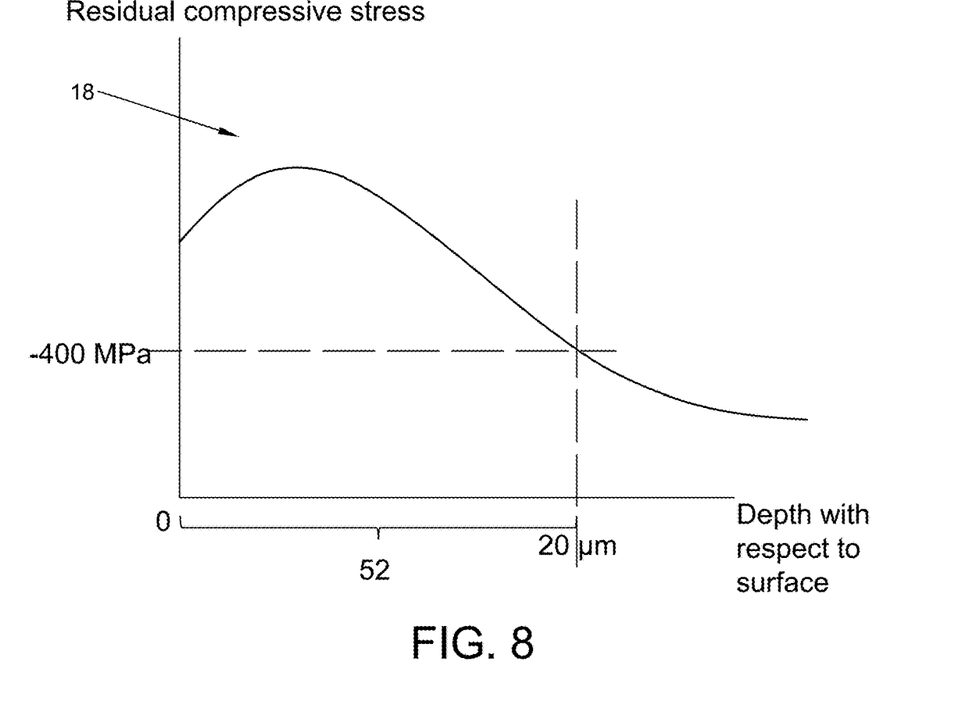
FIG. 8 a graph comparable to FIG. 7, where instead of the dislocation density, the residual compressive stress of the work-hardened measuring zone is shown over the depth with respect to the surface.

FIG. 7 shows the dislocation density, highlighted in the material and obtained by one of the above-mentioned machining processes, plotted versus depth, where 0 represents the position of the surface. Machining is carried out so that the dislocation density in the near-surface region 52 to 20 μm amounts to at least 5e8/cm2. FIG. 8 shows the residual compressive stress of a material machined in this way. This is such that the residual compressive stress is, in amount, at least 400 MPa in the region between the surface and a depth up to at least 20 μm.

Figure 9:
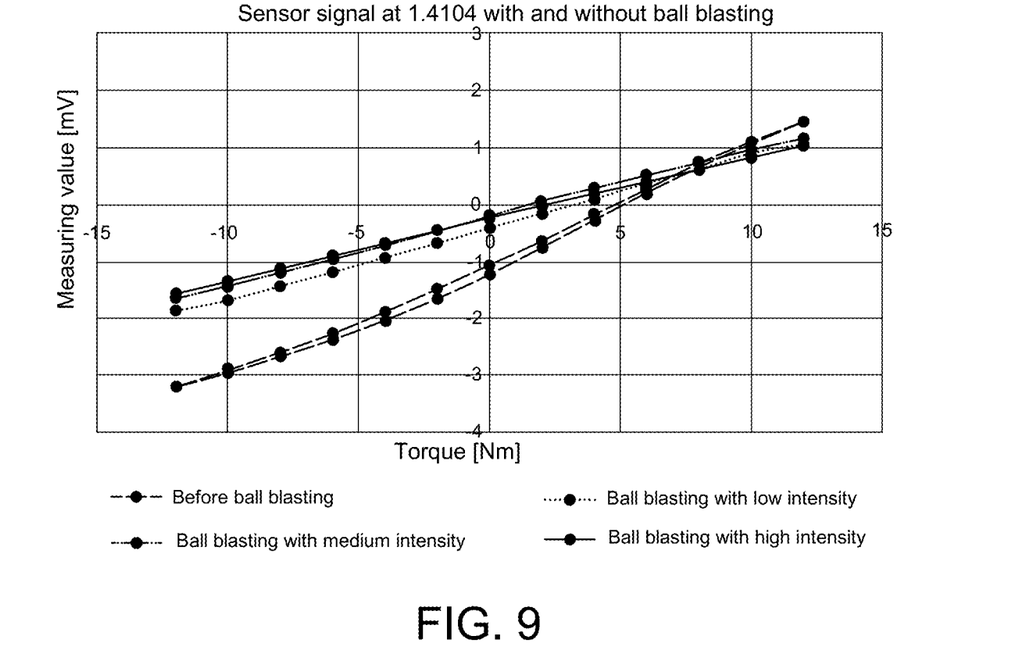
FIG. 9 a graph showing sensor signals on a measuring zone of steel 1.4.104 with and without work hardening, here illustrated by ball blasting.
Figure 10:
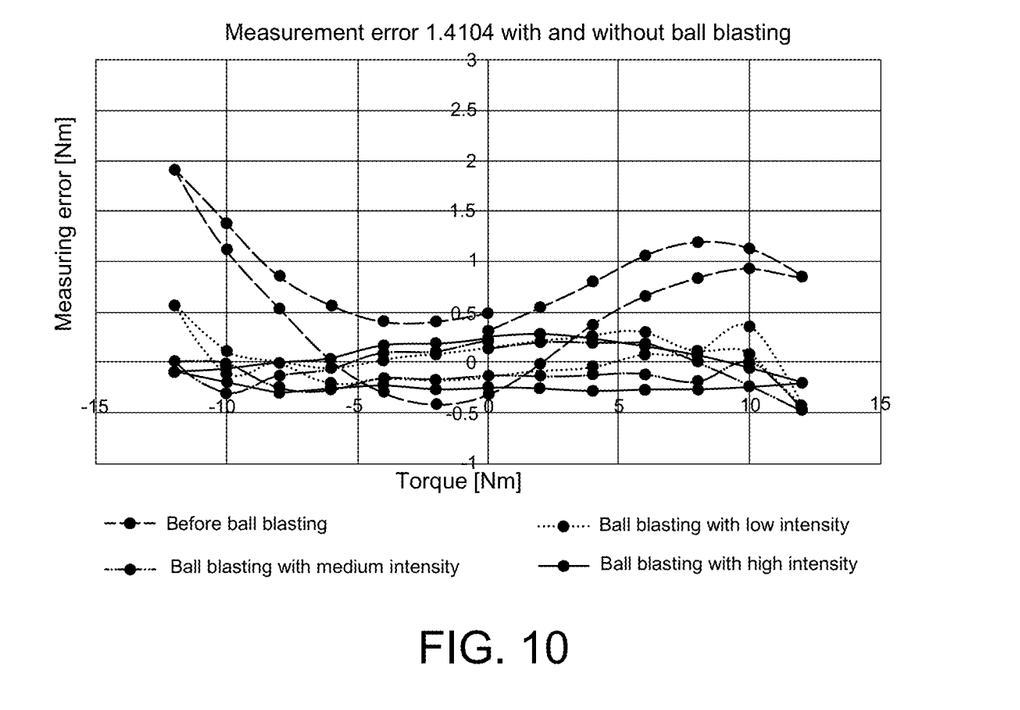
FIG. 10 a graph showing the measurement error for a measurement on a measuring zone of steel 1.4104 with and without ball blasting, where a measurement error compared to an ideal sensor for measuring zones with ball blasting and without ball blasting of different intensity is illustrated.
Figure 11:
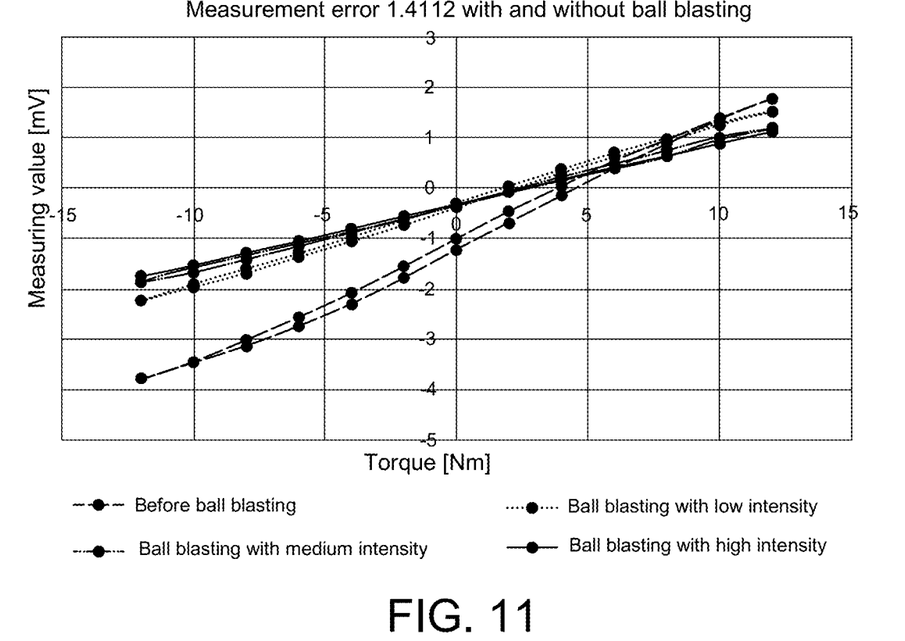
FIG. 11 a graph as in FIG. 9, where the measuring zone is formed from steel 1.4112.
Figure 12:
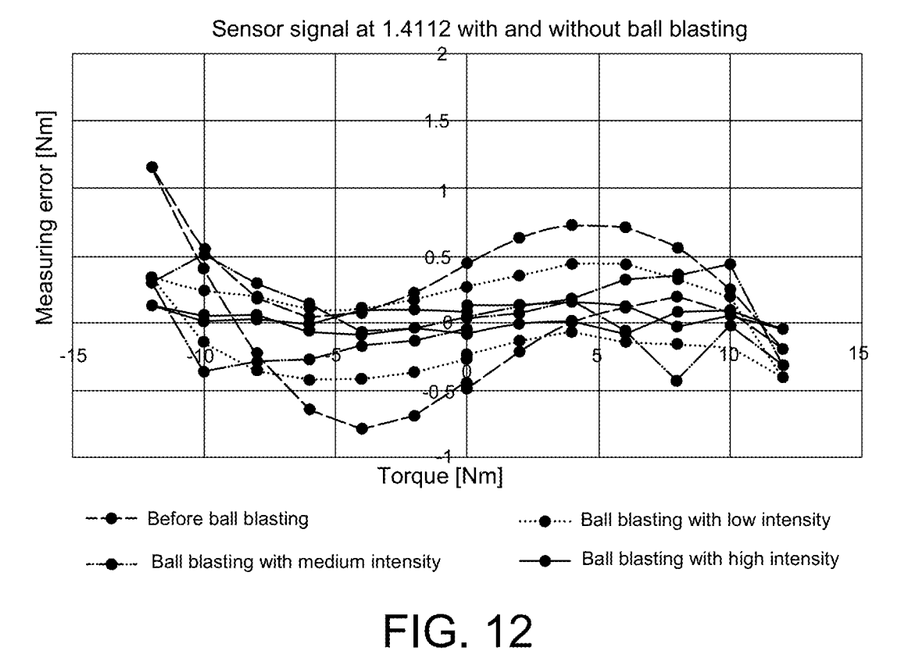
FIG. 12 a graph as in FIG. 10, where the measuring zone is formed from steel 1.4112.
Figure 13:
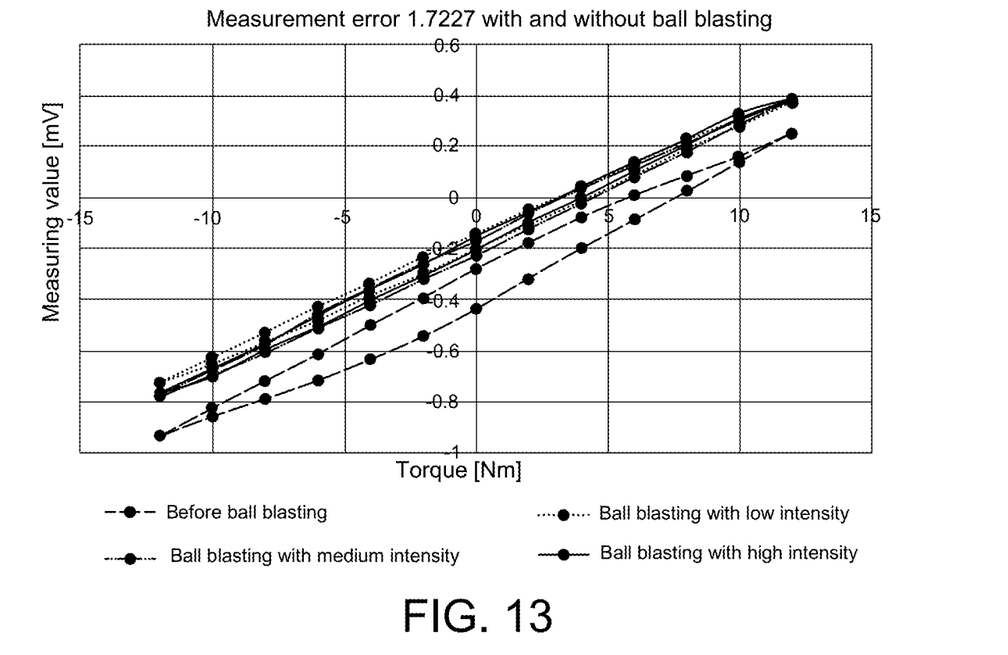
FIG. 13 a graph as in FIG. 9, where the measuring zone is formed from steel 1.7227.
Figure 14:
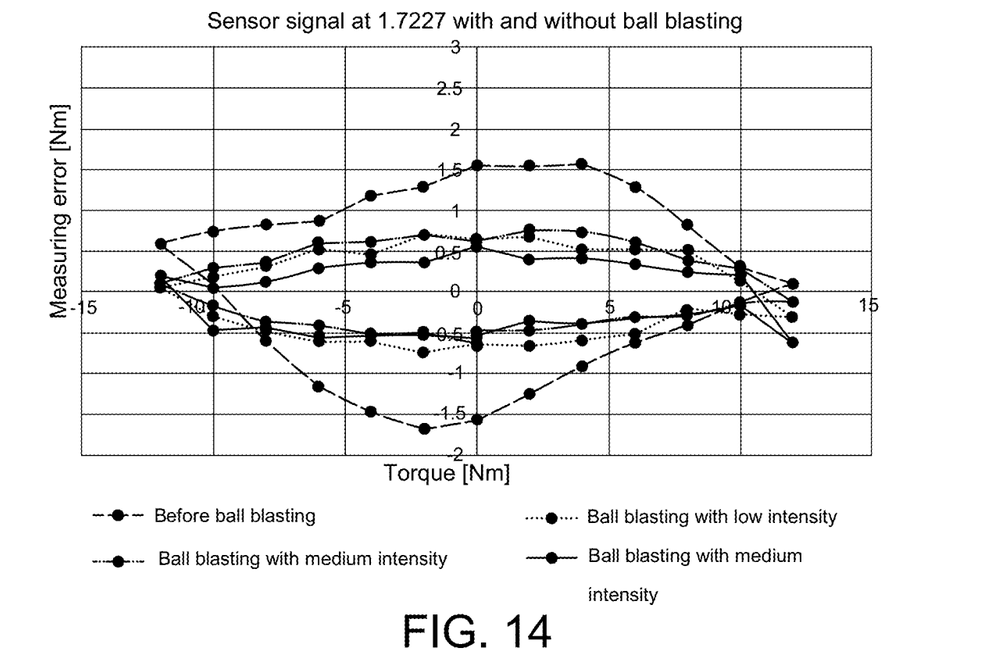
FIG. 14 a graph as in FIG. 10, the measuring area being formed from steel 1.7227.

FIG. 9 uses the example of the material steel 1.4104 to illustrate the influence of work hardening using ball blasting with different intensities. While a test object 12 whose measuring zone 18 has not been shot blasted shows significant deviations from an ideal characteristic curve which passes linearly through the zero point, measured values on test objects 12 with ball blasting approach the ideal line. FIG. 10 shows the measurement deviation from the ideal sensor for a test object 12 with a measuring zone 18 of steel 1.4104 with and without ball blasting. Here, too, it can be seen that the measured values improve significantly for a measuring zone 18 with cold deformation compared to the unmachined material. FIGS. 11 and 12 show comparable graphs to FIG. 9 and FIG. 10 for steel 1.4 112 to form the measuring zone 18; and FIGS. 13 and 14 show the corresponding graphs for steel 1.7227 as the material for the measuring zone 18.

As can be seen from these examples, the effect of cold forming exists for different materials.

Preferably, the following materials are considered as materials from which the test object 12, the secondary transmission element 42 or at least their measuring zone 18 is formed:
   work-hardened metallic material with a residual stress which is >400 MPa in amount, and with a permeability >2,
   work-hardened steel with a residual stress which is >400 MPa in amount,
   work-hardened iron with a residual stress >400 MPa in amount, with <30% alloying elements,
   work-hardened nickel with a residual stress which is >400 MPa in amount, with <30% alloying elements,
   work-hardened cobalt with a residual stress which is >400 MPa in amount, with <30% alloying elements,
   work-hardened iron-nickel alloy with a residual stress >400 MPa in amount, with <30% other alloying elements,
   work-hardened iron-cobalt alloy with a residual stress >400 MPa in amount, with <30% other alloying elements,
   work-hardened cobalt-nickel alloy with a residual stress which is >400 MPa in amount, with <30% other alloying elements, and
   work-hardened iron-cobalt-nickel alloy with <30% other alloying elements.

In the following, the differences between the individual embodiments of the load measuring arrangement 10 illustrated in FIGS. 1 to 6 will be discussed in more detail.

FIG. 1 shows an embodiment of the load measuring arrangement 10 in which the measuring zone 18 is arranged on the test object 12. The test object 12 is, for example, a lever arm of a lifting tool or a gear element. The test object 12 is locally plastically work-hardened at the measuring zone 18 by one of the above-mentioned processing methods. In other words, the test object 12 has a work-hardened region 54 which may be magnetized and at which magnetostrictive load is measured. Alternatively, the load measuring device 14 may comprise a measuring sensor 24 suitable for active magnetization, as described and shown in literature [1] to [17]. The test object 12 is formed, for example, from one of the steel grades described in FIGS. 9 to 14.

The embodiment of the load measuring arrangement 10 shown in FIG. 2 is essentially the same as the embodiment shown in FIG. 1 and described above, with the difference that the entire test object 12 has been made of the work-hardened material. For this purpose, the entire test object 12 may be subjected to one of the above-mentioned machining processes for plastic deformation after its formation, or it may be work-hardened during the formation process, or it may be formed from a material already previously work-hardened.

FIG. 3 shows an embodiment of the load measuring arrangement 10, in which the test object 12 is formed as a component, for example in the form of a shaft, in which the measuring zone 18 is a work-hardened region 54 of the component, in particular of the shaft. In the embodiment shown, the load measuring device 14 is designed as described and shown in literature [3], wherein a plurality of sensor heads 22/measuring sensors 24 are arranged around the measuring zone 18 of the shaft.

In the following, the embodiments of FIGS. 4 to 6 will be explained in more detail.

In these embodiments, the test object 12 has the measurement object 32 such as a shaft, a chassis component, a power transmission element, a gear element, a bicycle crank, or any other element on which a load, such as a force, a mechanical stress, a torque, is to be measured.

The measurement object 32 has a base body 34 with a first region 36, a transmission region 38 and a second region 40. Between the first region 36 and the second region 40, the load to be measured is applied. The first region 36 is, for example, an input region, such as an input end of a shaft or an input region of an area of interest of the measurement object 32 with respect to the load to be measured. The second region 40 is, for example, an output end of a shaft or an output region of an area of interest of the measurement object 32 with respect to the load to be measured. The transmission region 38 connects the first region 36 to the second region 40, such that the majority of the load is received by the transmission region 38. The base body 34 and, in particular, the transmission region 38 are configured to be optimized with respect to the function that the measurement object 32 is intended to perform. In particular, the base body 34 and the transmission region 38 need not be formed of a material which is optimized or even formed for magnetostrictive load measurement. For example, the base body 34 could be formed of fiber-reinforced materials, non-metals, or metals with no magnetic properties or only poor magnetic properties. If a base body 34 of steel is selected, the steel grade need not be selected for magnetostrictive properties or machined or coated.

The test object 12 further comprises the secondary transmission element 42, which is subject to load parallel to the transmission region 38 and receives a smaller portion of the load between the first region 36 and the second region 40. The secondary transmission element 42 and the transmission region 38 are not connected to each other, so that local relative displacements between the secondary transmission element 42 and the transmission region 38 are possible and, in particular, locally different deformations of the transmission region 38 and the secondary transmission element 42 are possible.

The measuring zone 18 is formed on the secondary transmission element 42. The secondary transmission element 42 is plastically deformed either locally at the measuring zone 18 or as a whole by one of the above-mentioned machining processes and has, at least at the measuring zone 18, the distribution of the dislocation density and the residual compressive stress shown in FIGS. 7 and 8. Higher values of dislocation density or magnitude of residual compressive stress may also be present.

Thus, the secondary transmission element 42 is optimized with respect to material processing, but preferably also with respect to design and material selection for magnetostrictive load measurement substantially independently of the main body 34.

The secondary transmission element 42 has a first connecting region 44, the measuring zone 18 and a second connecting region 46. The first connecting region 44 attaches the secondary transmission element 42 to the first region 36 of the base body 34. With the second connecting region 46, the secondary transmission element 42 is attached to the second region 40 of the base body 34. Possible fastening methods for fastening the connecting regions 44, 46 to the regions 36, 40 of the base body 34 are:
1. rivets
2. screws
3. materially bonded
   a. welding
   b. soldering
   c. gluing
   d. bonding
4. shrinking
5. crimping FIG. 4 shows a fourth embodiment of the load measuring arrangement 10, which is provided with the secondary transmission element 42. The base body 34 has projections or cantilevers 48 at the first region 36 and the second region 40, the free ends of which are connected to the connecting regions 44, 46 of the secondary transmission element 42. The secondary transmission element 42 is placed over and connected to these cantilevers 48 in a bridge-like manner. In this embodiment, the measuring sensor 24 is fixedly connected to the secondary transmission element 42. In a variant not shown, the measuring sensor 24 is fixedly connected to the base body 34, for example below the secondary transmission element 42. When a load, such as torque or force, is applied between the left end and the right end of the base body 34, a major part of this force is passed through the transmission region 38, while a smaller portion is introduced into the secondary transmission element 42 through the cantilevers 48 and the connecting regions 44, 46. Thus, if the base body 34 is deformed by the load, for example, then the secondary transmission element 42 is also deformed. The stresses that occur as a result in the secondary transmission element 42 can be detected magnetostrictively and are a measure of the load applied to the base body 34.

Figure 5:
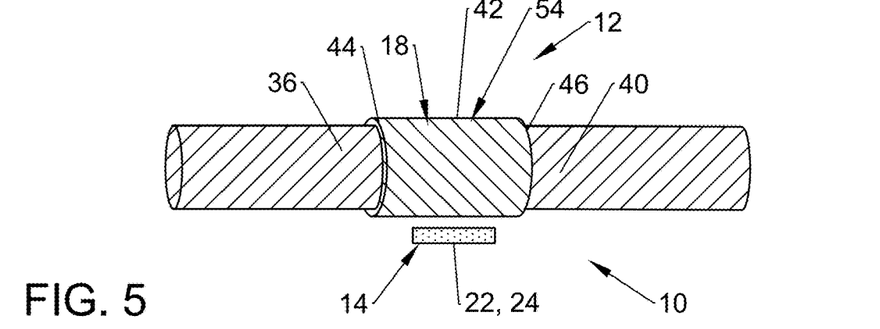
FIG. 5 a schematic block diagram of a fifth embodiment of the load measuring arrangement.

As shown by the embodiment of FIG. 5, the base body 34 can also be at least partially cylindrical in shape, with the secondary transmission element 42 also being at least partially cylindrical in shape. In the embodiment shown in FIG. 5, the measurement object 32 is a shaft with a cylindrical shape. The secondary transmission element 42 is formed as a sleeve which is slipped over the shaft. The two ends of the sleeve forming the secondary transmission element 42 are connected to the base body 34 and thus form the connecting regions 44, 46. The inner side of the sleeve forming the secondary transmission element 42 is either formed at a distance from the outer side of the transmission region 38 covered by the sleeve here or rests thereon in a sliding manner.

Figure 6:
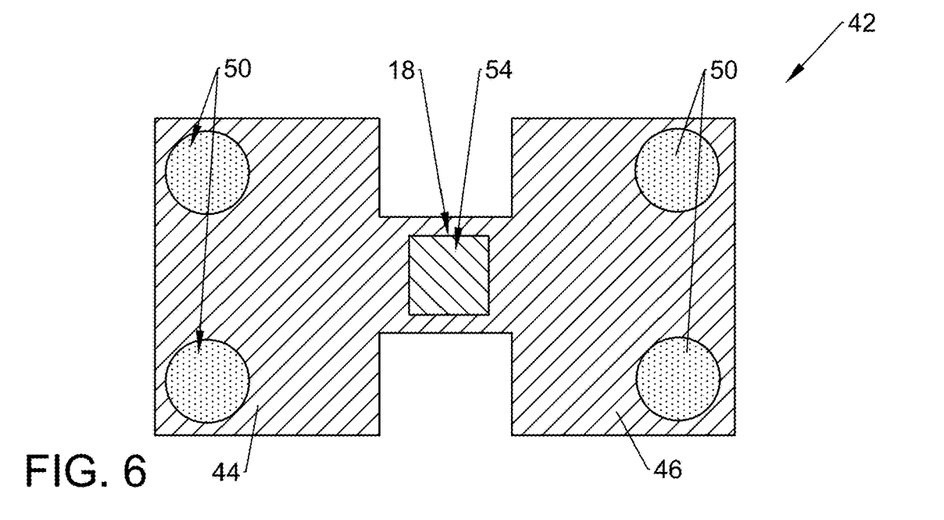
FIG. 6 a schematic bottom view of a secondary transmission element for a load measuring arrangement according to a further embodiment.

FIG. 6 shows an embodiment of the secondary transmission element 42 formed to serve as a signal amplifier. The secondary transmission element 42 is formed such that stresses generated by a relative movement of the connecting regions 44, 46 are concentrated in the measuring zone 18. For example, the connecting regions 44, 46, shown here with contact points 50, for example welding points, are formed of a thicker material or are substantially larger in width than the measuring zone 18. The design is such that stress is concentrated at that surface of the measuring zone 18 which faces the measuring sensor 24. This can be achieved by appropriate thicknesses and transitions between the connecting regions 44, 46 and the measuring zone 18. The design is selected such that the voltage in the near-surface region of the measuring zone 18 is at least 20 percent higher than the average voltage between the contact points 50 of the first and second connecting regions 44, 46.

LIST OF REFERENCE SIGNS 10 load measuring arrangement
12 test object 14 load measuring device
16 magnetic field detection device (16a, 16b)
16a first magnetic field detection device (16a, 16b)
16b second magnetic field detection device (16a, 16b)
18 measuring zone
20 magnetic field generating device
22 sensor head
24 measuring sensor
26 supply and evaluation unit
28 generator coil
30a first measuring coil
30b second measuring coil
32 measurement object
34 base body
36 first region
38 transmission region
40 second region
42 secondary transmission element
44 first connecting region
46 second connecting region
48 cantilever
50 contact points
52 near-surface region
54 work-hardened region

The invention claimed is:

1. A load measuring arrangement comprising a test object and a load measuring device for measuring a load on the test object, wherein the load measuring device includes at least one magnetic field detection device for detecting a magnetic field parameter changing due to load at a measuring zone of the test object, wherein the test object is work-hardened at least at the measuring zone and at least in a near-surface region, which extends from a surface facing the magnetic field detection device to a depth of 20 μm, in such a way that it has a dislocation density of at least $5e8/cm^2$ and/or a residual compressive stress of at least 400 MPa.

2. The load measuring arrangement according to claim 1, wherein the test object is work-hardened locally at the measuring zone.

3. The load measuring arrangement according to claim 1, wherein the test object or a partial element thereof is made entirely of a work-hardened material.

4. The load measuring arrangement according to claim 1, wherein the test object comprises a transmission region which receives a major part of the load between a first and a second regions of the test object, wherein a secondary transmission element is attached to the first and second regions of the test object such that it receives a smaller portion of the load between the first and second regions parallel to the transmission region, wherein the work-hardened measuring zone is formed on the secondary transmission element.

5. The load measuring arrangement according to claim 4, characterized by at least one or more of the following features:
   that the secondary transmission element
   5.1 is magnetostrictive and is attached to the test object in such a way that a deformation of the test object leads to a deformation of the secondary transmission element, the load measuring device being configured to determine the load on the secondary transmission element;
   5.2 is formed from the same material as the transmission region, but material properties differ due to cold deformation;
   5.3 is fixedly connected with a first connecting region to the first region of the test object and is fixedly connected with a second connecting region to the second region of the test object, wherein a measuring zone of the secondary transmission element arranged between the first and second connecting regions is not connected to the transmission region and is loaded in parallel when the transmission region is loaded, wherein the load measuring device is configured to measure the load on the measuring zone by active magnetization and to determine a magnetic parameter which changes as a result of the load; or
   5.4 is connected to the test object by a connection technique selected from the group consisting of riveting, screwing, material connection, welding, soldering, gluing, bonding, shrinking-on, and crimping.

6. The load measuring device according to claim 5, characterized by at least one or more of the following features:
   6.1 that the measuring zone connects the first and second connecting regions in a bridge-like manner,
   6.2 that the measuring zone has a smaller thickness and/or width than the first and second connecting regions;
   6.3 that the secondary transmission element is configured based on the construction and relative geometry of the first and second connecting regions and the measuring zone in such a way that a strain between the first region and the second region of the test object leads to a greater strain at the measuring zone;
   6.4 that the secondary transmission element is configured based on the construction and relative geometry of the first and second connecting regions and the measuring zone in such a way that a strain between the first region and the second region of the test object leads to a strain at the measuring zone changed in such a way that an average strain or average stress at a measuring position of the measuring zone, which measuring position extends from a surface facing a measuring sensor of the load measuring device to a depth corresponding to the penetration depth of the magnetic field, differs by at least 20% from the average strain or average stress of the secondary transmission element;
   6.5 that the first and second connecting regions are formed to be substantially more rigid than the measuring zone;
   6.6 that the first connecting region, the measuring zone and the second connecting region are configured as sleeves which are fastened to one another in axial succession and in which the transmission region is accommodated, the first and second connecting regions having a greater wall thickness than the measuring zone, the ends of the first and second connecting regions which are arranged away from one another being connected to the first or second region of the test object, but relative movements between the sleeves and the transmission region being possible between the first and second regions; or
   6.7 the measuring zone is more elastic than the transmission region.

7. The load measuring arrangement according to claim 1, characterized by at least one or more of the following features:
   that the load measuring device
   7.1 comprises a first and a second magnetic field detection devices for detecting the magnetic field parameter changing due to the load on the secondary transmission element;
   7.2 comprises a magnetic field generating device for actively generating a magnetic field at the measuring zone;

7.3 comprises a generator coil and at least two measuring coils;

7.4 comprises planar coils;

7.5 comprises at least three coils arranged in a V-shape or five coils arranged in an X-shape; or 7.6 comprises a measuring sensor having the magnetic field generating device and the at least one magnetic field detecting device, and a supply and evaluation unit connected to the measuring sensor.

8. The load measuring arrangement according to claim 1, characterized in that the test object is formed, at least at the measuring zone, from a material of the group consisting of a work-hardened metallic material with a residual stress which is >400 MPa and with a permeability >2, work-hardened steel with a residual stress which is >400 MPa, work-hardened iron with a residual stress which is >400 MPa, with <30% alloying elements, work-hardened nickel with a residual stress which is >400 MPa, with <30% alloying elements, work-hardened cobalt with a residual stress which is >400 MPa, with <30% alloying elements, work-hardened iron-nickel alloy with a residual stress which is >400 MPa, with <30% other alloying elements, work-hardened iron-cobalt alloy with a residual stress which is >400 MPa, with <30% other alloying elements, work-hardened cobalt-nickel alloy with a residual stress which is >400 MPa, with <30% other alloying elements, and work-hardened iron-cobalt-nickel alloy with <30% other alloying elements.

9. The load measuring arrangement according to claim 1, characterized by at least one or more of the following features:

that the load measuring device 9.1 is configured to measure a force, a strain, a torque or an axial stress with the aid of an active magnetic sensor system;

9.2 includes a measuring sensor which is fixedly connected to the test object and has the magnetic field generating device and the at least one magnetic field detection device;

9.3 includes a measuring sensor which is fixedly connected to the secondary transmission element and has the magnetic field generating device and the at least one magnetic field detection device; or 9.4 includes a stationarily mounted measuring sensor for contactless load measurement on the test object that is capable of being rotated about an axis of rotation.

10. The load measuring arrangement according to claim 1, characterized by at least one or more of the following features:

that the test object 10.1 is a shaft for transmitting a torque;

10.2 is a gear element for transmitting a force or a torque; or 10.3 is a part of a vehicle or lifting tool subjected to load in operation.

11. A use of the load measuring arrangement according to claim 1 in a load measuring method for measuring a load applied to a test object between a first and a second regions.

12. A manufacturing method for manufacturing the load measuring arrangement according to claim 1, comprising:

a1) providing a test object in which at least one measuring zone is formed from a metallic material having magnetostrictive properties, and plastically deforming at least the measuring zone at a temperature below the recrystallization temperature, in order to obtain a dislocation density of at least $5e8/cm^2$ and/or a residual compressive stress of at least 400 MPa at least in a near-surface region extending from a surface facing the magnetic field detection device to a depth of 20 μm, or a2) providing a metallic material, plastically deforming at least a portion of the metallic material at a temperature below the recrystallization temperature to obtain a dislocation density of at least $5e8/cm^2$ and/or a residual compressive stress of at least 400 MPa at least in a near-surface region extending from a surface facing the magnetic field detection device to a depth of 20 μm, and producing a test object from the material thus processed so that the plastically deformed region forms a measuring zone; and b) arranging a load measuring device at the measuring zone of the test object, wherein the load measuring device comprises at least one magnetic field detecting device for detecting a magnetic field parameter changing due to load at the measuring zone of the test object.

13. The manufacturing method according to claim 12, wherein for performing the plastic deformation in the alternative steps a1) or a2), the near-surface region is plastically deformed by at least one of the methods selected from the group consisting of rolling, ball rolling, smooth rolling, deep rolling, blasting, ball blasting, glass bead blasting, ultrasonic blasting, stainless steel blasting, wire grain blasting, sand blasting, ice blasting, high pressure water blasting, wet blasting, laser shock blasting, deep drawing, and denning.

14. The manufacturing method according to claim 12, further comprising:

providing a base body of the test object;

providing a secondary transmission element, wherein the secondary transmission element is manufactured separately from the base body under plastic deformation according to steps a1) or a2);

attaching a first connecting region of the secondary transmission element to a first region of the test body and a second connecting region to a second region of the test body, so that the measuring zone of the secondary transmission element located between the first and second connecting regions and a transmission portion of the test body located between the first and second regions are capable of moving relative to each other to perform different deformations; and arranging the load measuring device for measuring the load at the measuring zone of the secondary transmission element.

* * * * *